April 9, 1963  B. MLÁDEK ET AL  3,084,779
DEVICE FOR TRANSFERRING BAKERY PRODUCTS OR OTHER ARTICLES
BY GRAVITY BETWEEN TWO SUPERPOSED CONVEYOR BELTS
Filed Oct. 31, 1960

BEDŘICH MLÁDEK
JAN VODRAŽKA
LUDVÍK BUDÍČEK
JOSEF STRANSKÝ
        *INVENTORS.*

BY  Karl G. Ross

AGENT.

United States Patent Office 3,084,779
Patented Apr. 9, 1963

3,084,779
DEVICE FOR TRANSFERRING BAKERY PRODUCTS OR OTHER ARTICLES BY GRAVITY BETWEEN TWO SUPERPOSED CONVEYOR BELTS
Bedřich Mládek, Jan Vodrážka, Ludvík Budíček, and Josef Stránský, all of Prague, Czechoslovakia, assignors to Zavody potravinarskych a chladicich stroju, Pardubice, Czechoslovakia
Filed Oct. 31, 1960, Ser. No. 66,313
Claims priority, application Czechoslovakia Oct. 29, 1959
4 Claims. (Cl. 198—27)

The present invention relates to a device for transferring bakery products or other articles by gravity between two superposed conveyor belts.

In up-to-date bakery ovens, in particular those equipped with conveyor belts, the latter are arranged in superposed relationship with a view to a satisfactory utilization of the baking space. Such an arrangement is adopted in order to reduce the required floor space for erecting the oven and further for reasons of heat and production economy. If the conveyor belts in the oven are arranged above one another, it is necessary to provide at the discharge end of the upper belt and above the intake end of the lower belt suitable means for transferring the products carried by the upper belt to the lower belt on which the articles are then conveyed in opposite direction.

Further known are ovens in which both baking belts travel in the same direction and wherein, at the point where the articles have to be transferred from one belt to the other, the first belt is raised above the other belt and the transfer means is simplified to some extent or provided with a chute only. The belt onto which the articles are transferred, i.e. the lower conveyor belt of the oven, travels usually with a lower speed so that the products placed thereon occupy a smaller space.

Another known device for transferring bakery products from a higher belt to a lower belt is equipped with a tiltable conveyor belt which at one side is alternately raised and lowered, said transferring belt accomplishing its conveying motion alternatingly in both directions.

It is a disadvantage of the known devices for transferring bakery products from a higher belt to a lower belt that the rows of products deposited on the lower belt cannot be placed in proper order.

It is an object of the present invention to provide a device for transferring bakery products or other articles by gravity, said device being substantially free from the above disadvantage.

Another object of the invention is to provide a device of the aforesaid type which is capable of maintaining the aligned rows of bakery products or other articles and of securing their deposition on the lower belt onto which they are transferred in the order of their arrival over the upper belt, their original position being thus retained.

According to the invention a tiltable tray is provided which is swingable about a horizontal axis at one end and which in its raised position forms an extension of the chute surface and, in its lowered position, deflects part of the free end of a deformable base plate placed above the lower conveyor belt, while a lifting frame, which is raised by the upward movement of the tray, bears against an arm of a retaining comb which is pivotable about another horizontal axis. The comb is equipped with two rows of fingers, each of which is independently and resiliently mounted, and the tiltable tray is operatively connected by means of a suitable linkage to the drive of the upper or the lower conveyor belt.

An illustrative embodiment of the device according to the invention is shown diagrammatically in the accompanying drawing wherein.

Figure 1:
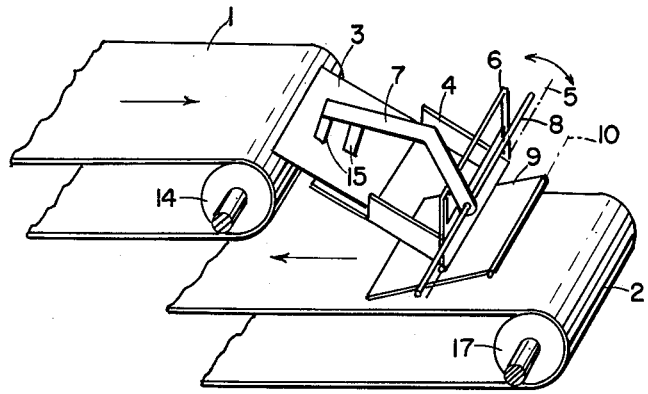
FIG. 1 shows in an axonometric view the device according to the invention.

Inclinedly positioned adjacent the roller 14 of the upper conveyor belt 1 is a chute 3, above which retaining combs are accommodated along its entire width. These combs consist of fingers 15, each of which is resiliently mounted, and are placed on rake arms 7 (only one shown) which are mounted for pivotal movement about an axle 8. A tiltable tray 4 is adapted to swivel about its axle 5, a lifting frame 6 being rigidly connected therewith to act as a motion transmitter between tray 4 and arm 7. Also in inclined position above the lower belt 2 is a base plate 9 supported by a rod 10, a linkage 11 being operatively connected with a belt drive 12 which is shown coupled via a transmission 16 with the roller 17 of the conveyor belt 2.

Figure 2:
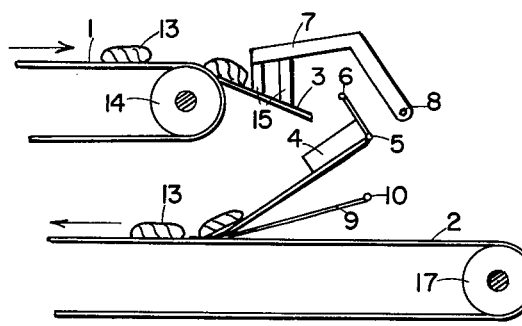
FIG. 2 is a side view of the device showing the comb and the tray thereof in lowered position.

The bakery products 13 conveyed in rows on the upper conveyor belt 1 arrive at the chute 3 near the point where the conveyor belt reaches the round surface of the roller 14, the inclination of chute 3 being such as to achieve a predetermined sliding speed of the articles. Arranged as an extension of the chute 3 is the tiltable tray 4, which in its upper limiting pivotal position has the same inclination as the chute 3 and in its lower limiting pivotal position is inclined downwardly approximately the same angle below the horizontal plane; and in this latter position (FIG. 2) the free edge of tray 4 contacts the base plate 9 above the conveyor belt 2.

The base plate 9 is made of a material which is resilient even at the elevated temperatures prevailing in the oven and when the tiltable tray bears on the base plate 9 the latter is deflected, i.e. bent downwards; after the tray is raised again its deflection is straightened out whereby the articles 13 are forced to slide onto the lower belt 2. The articles which have slid down to the surface of the tiltable tray 4 are stopped by its raised border, constituted by the lower part of frame 6, whereupon the linkage 11 moves the tray 4 to its lower position and the products slide down onto the base plate 9.

Figure 3:
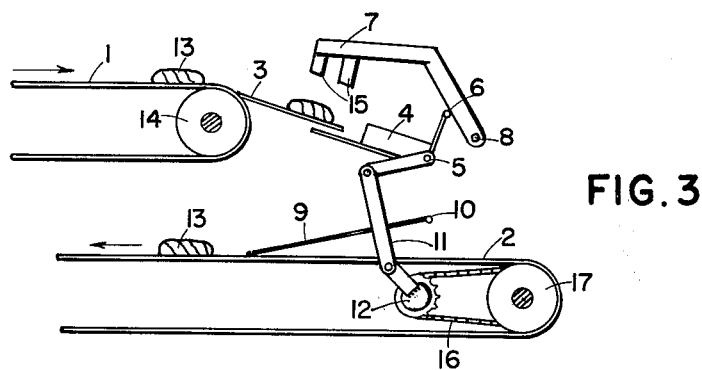
FIG. 3 shows the device in a side view similar to FIG. 2 but with the tray and the comb in raised position.

Simultaneously with the changed position of the tray 4 the rake arm 7 is lowered and the stop fingers thereon retain the subsequently arriving articles on the upper belt 1, in order to prevent them from falling onto the tray 4 in its lowered position. As the tray 4 subsequently rises (FIG. 3), the arm 7 is lifted again by the motion-transmitting frame 6. The retaining comb 7, 15 has for its further purpose the partial alignment of the row of oncoming articles 13 on the belt 1. The linkage 11 and its drive 12, shown here as a crank arm articulating the axle 5, can be arranged in any other suitable way, e.g. by means of a cam disc or a four-joint mechanism, and the tilting speed in either direction can be variable.

It is an advantage of the novel device that it is suitable for transferring various kinds of bakery products irrespective of their weight or shape and that it is adapted to overcome any differences in level between the two conveyor belts. The device is suitable also for transferring numerous other articles between two conveyor belts, and the lower belt can be turned in any desired direction in relation to the upper belt.

We claim:

1. A device for transferring transported objects from the delivery end of a continuously moving upper conveyor belt to the upper surface of a continuously moving lower conveyor belt, comprising continuously operative drive means for one of said belts, a tray member having a front portion fulcrumed on a first horizontal axis for swinging between an upwardly inclined limiting position and a downwardly inclined limiting position, said tray member having a rear edge remote from said axis lying above said axis in line with said upper belt in said upwardly inclined position and lying below said axis near the upper surface of said lower belt in said downwardly inclined position, at least one arm member overlying said tray member, said arm member being swingable about a second horizontal axis disposed forwardly of said rear edge, a depending finger on the rear end of said arm member interposable in the path of said objects from said upper belt onto said tray member, motion-transmitting means on one of said members adapted and disposed to coact with the other of said members for raising said arm member upon a return of said tray member to said upwardly inclined position, thereby lifting said finger sufficiently to enable the passage of the next of said objects onto said tray member, and link means coupling said drive means with said tray member for periodically swinging the latter between said limiting positions.

2. A device according to claim 1 wherein said motion-transmitting means comprises a frame rigid with said tray member adjacent said first axis, said frame forming a raised border for the front of said tray member.

3. A device for transferring transported objects from the delivery end of a continuously moving upper conveyor belt to the upper surface of a continuously moving lower conveyor belt, comprising a tray swingable about a horizontal axis between an upwardly inclined limiting position and a downwardly inclined limiting position, said tray having an edge remote from said axis lying above said axis in line with said upper belt in said upwardly inclined position and lying below said axis near the upper surface of said lower belt in said downwardly inclined position, actuating means coupling said drive means with said tray for periodically swinging the latter between said limiting positions, and guide means for directing said objects from said upper belt onto said tray in said upwardly inclined position and from said tray onto said lower belt in said downwardly inclined position, said guide means including a resilient plate sloping downwardly onto the upper surface of said lower belt and contacting said surface with its lowermost portion, said edge being positioned above said lowermost portion for resiliently deforming it against said surface in said downwardly inclined position whereby an object deposited from said tray on said plate is resiliently discharged onto said surface upon the subsequent lifting of said edge.

4. A device for transferring transported objects from the delivery end of a continuously moving upper conveyor belt to the upper surface of a continuously moving lower conveyor belt, comprising continuously operative drive means for one of said belts, a tray member swingable about a first horizontal axis between an upwardly inclined limiting position and a downwardly inclined limiting position, said tray member having an edge remote from said axis lying above said axis in line with said upper belt in said upwardly inclined position and lying below said axis near the upper surface of said lower belt in said downwardly inclined position, an arm member swingable about a second horizontal axis, stop means on said arm member interposable in the path of said objects from said upper belt onto said tray member, motion-transmitting means on one of said members adapted and disposed to coact with the other of said members for raising said arm member upon a return of said tray member to said upwardly inclined position, thereby lifting said stop means sufficiently to enable the passage of the next of said objects onto said tray member, link means coupling said drive means with said tray member for periodically swinging the latter between said limiting positions, and guide means for directing said objects from said upper belt onto said tray member in said upwardly inclined position and from said tray member onto said lower belt in said downwardly inclined position, said guide means including a resilient plate sloping downwardly onto the upper surface of said lower belt and contacting said surface with its lowermost portion, said edge being positioned above said lowermost portion for resiliently deforming it against said surface in said downwardly inclined position whereby an object deposited from said tray member on said plate is resiliently discharged onto said surface upon the subsequent lifting of said edge.

References Cited in the file of this patent

UNITED STATES PATENTS

| | | |
|---|---|---|
| 690,416 | Fuller | Jan. 7, 1902 |
| 1,435,263 | Soubier | Nov. 14, 1922 |
| 2,000,269 | Absmeier | May 7, 1935 |
| 2,244,430 | Parsons | June 3, 1941 |